US008693376B2

(12) United States Patent
Ekstrom et al.

(10) Patent No.: US 8,693,376 B2
(45) Date of Patent: Apr. 8, 2014

(54) MONITORING IN A TELECOMMUNICATION NETWORK

(75) Inventors: Bo Ekstrom, Stockholm (SE); Hakan Axelsson, Uppsala (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 637 days.

(21) Appl. No.: 10/595,145

(22) PCT Filed: Sep. 5, 2003

(86) PCT No.: PCT/SE03/01392
§ 371 (c)(1), (2), (4) Date: May 3, 2007

(87) PCT Pub. No.: WO2005/025133
PCT Pub. Date: Mar. 17, 2005

(65) Prior Publication Data

US 2007/0258379 A1 Nov. 8, 2007

(51) Int. Cl.
*H04L 12/16* (2006.01)

(52) U.S. Cl.
USPC .......................................................... 370/270

(58) Field of Classification Search
USPC ......... 370/260, 270; 379/7; 455/456.1, 404.1, 455/414.1
See application file for complete search history.

(56) References Cited

U.S. PATENT DOCUMENTS

| | | | | |
|---|---|---|---|---|
| 5,742,765 A | | 4/1998 | Wong et al. | |
| 5,796,732 A | * | 8/1998 | Mazzola et al. | 370/362 |
| 6,097,798 A | * | 8/2000 | Albers et al. | 379/114.28 |
| 6,563,824 B1 | * | 5/2003 | Bhatia et al. | 370/392 |
| 2001/0005372 A1 | | 6/2001 | Cave et al. | |
| 2002/0080720 A1 | * | 6/2002 | Pegrum et al. | 370/236 |
| 2004/0190689 A1 | * | 9/2004 | Benitez Pelaez et al. | 379/88.13 |

FOREIGN PATENT DOCUMENTS

| | | |
|---|---|---|
| EP | 1 265 454 A1 | 12/2002 |
| JP | 11-150539 | 6/1999 |
| JP | 2001-237845 | 8/2001 |

* cited by examiner

*Primary Examiner* — Mark Rinehart
*Assistant Examiner* — Peter Cheng

(57) ABSTRACT

The present invention relates to a method for monitoring media flow in a telecommunication network. The network comprises a media-handling node (MHN) through which, sessions between subscribers are transported via first ports (PI1-PI5) and second ports (PO1-PO5). An extra port (XP1-XP5) is assigned to the media-handling node (MHN) for each new session that is transported through the node. The method comprises the following steps: storing in a database (LI-DB), identification of a first subscriber (A) for which monitoring is desired; a connection is set-up between the first subscriber (A) and second subscriber (B); an assigned extra port (XP1) that is adherent to the session between the first and second subscriber (A, B) is connected; the session between the first and second subscriber is monitored via the connected extra port (XP1).

13 Claims, 4 Drawing Sheets

An extra port is assigned to the media handling node MHN for each new session that is transported through MHN — 101

An identification of subscriber A is stored in LI-DB — 102

A connection is set up between subscriber A and subscriber B — 103

An extra port XP1 that is adharent to the connection is connected — 104

The media session is monitored via XP1 — 105

MONITORING IN A TELECOMMUNICATION NETWORK

TECHNICAL FIELD OF THE INVENTION

The present invention relates to methods and arrangements for monitoring media flow in a telecommunication network that comprises a control domain that handles session control, and a bearer domain that handles the media flow.

DESCRIPTION OF RELATED ART

Three major trends currently occurs in telecommunication, i.e. 1) increasing amount of data traffic, 2) real-time communication goes from circuit switching to packet switching, and 3) new focus of real-time in packet switching, for example video and multimedia. The ever increasing amount of data traffic as well as real-time communication in packet switched networks leads to a demand for monitoring of this data traffic with the same level of security and confidentiality as known from circuit switched networks monitoring. In circuit switched networks, e.g. telephony networks, it is customary to monitor communication connections from a remote operation centre so that a network operator wishing to operate real time traffic can constantly receive information on the quality of the communication lines. Another application of monitoring is lawful interception, i.e. the act of intercepting a communication on behalf of a law enforcement agency.

From the above, it is only natural that network operators will want to continue such monitoring approaches in other types of networks for example in packet switched networks.

One approach is described in the international application WO 02/102111. It is proposed to provide an interception unit to store an identification of a communication connection to be monitored. A copying unit hereby copy selected cells to a monitoring connection. The solution according to the international application implies isolation of cells to be intercepted. According to the international application, a predefined session is monitored by listen to the session via an extra port. There is a possibility with the solution in the international application, for the end-user, to find out with which IP address he is communicating, i.e. to find out that interception is going on. This possibility is considered as a drawback.

Requirements for lawful interception in 3GPP (3$^{rd}$ Generation Partnership Project) networks are being standardised within 3GPP and ETSI. So far requirements on IMS (IP Multimedia Subsystem) for multimedia communication are only concerned with IRI (Intercept Related Information) and not with CC (Content of Communication), i.e. the media flow. The solutions specified so far within the standardisation work foresee interception only of IRI from IMS. This is a natural consequence of the fact that CC is, for normal two-party sessions, not processed within IMS. This means that CC will have to be intercepted by involving the backbone or access network. However, some of sessions in 3GPP require special media nodes in the IP-based network in order to handle the media flow. The following are examples of such cases:

- Multi-party sessions within the IP-based network which requires a multi-party node.
- Interworking with the legacy telephone network which requires a media gateway for the media flow.
- Interworking with other types of IP-based networks (e.g. between a SIP-based (Session Initiation Protocol) and H.323-based network) which also requires a gateway for the media flow.

The invention that now will be presented refers to this type of sessions and it proposes a principle for intercepting the content of a session for these cases.

SUMMARY OF THE INVENTION

The present invention relates to problems how to conceal, to involved parties, monitoring of media flow when the flow is monitored via an extra port in a media-handling node. Assigning an extra port to a media-handling node is a visible measures to an involved party.

The problem is solved by the invention by, for each media flow session that is transported through the media-handling node, assigning an extra port to the node and by connect assigned ports only for those sessions that are of interest to monitor. While assigning an extra port to a media-handling node is a visible measure to involved parties, the connecting of the port is not. Monitoring of a session is difficult to detect for an involved party when extra ports always are assigned for each session.

More in detail, the problem is solved by a method for monitoring media session flow in a telecommunication network that comprises a media-handling node through which session flows. The session is hereby transported via inports and outports in the node. An extra port is assigned to the media-handling node for each new session that is transported through the node. The method comprises the following further steps:

- Storing in a database LI-DB, identification of a first subscriber A for which monitoring is desired.
- Setting up a connection between the first subscriber A and a second subscriber B.
- Assigning an extra port (XP1) that is adherent to the session between the first and second subscriber (A, B).
- Connecting the assigned extra port XP1 that is adherent to the session between the first and second subscriber A, B.
- Monitoring the session between the first and second subscriber via the extra port XP1.

An arrangement according to the invention comprises means for performing the above mentioned method steps.

The object of the present invention is to make it possible to perform real-time monitoring of Content of Communication flow and to conceal the monitoring to involved subscriber.

Another advantage is that a minimum of adaptations of the normal network functions is required.

Another advantage is that the invention makes it possible to perform real-time interception of the session initiated by the control network.

Another advantage is that the invention does not require any re-routing of the media session. Since the session is routed and treated exactly in the same manner as if the call was not intercepted it is impossible for the end user to find out whether the call is intercepted or not.

Yet another advantage is the possibility to conceal interception to other networks and to personnel that is involved in the operation and maintenance of the network.

The invention will now be described more in detail with the aid of preferred embodiments in connection with the enclosed drawings.

DETAILED DESCRIPTION OF EMBODIMENTS

Figure 1:
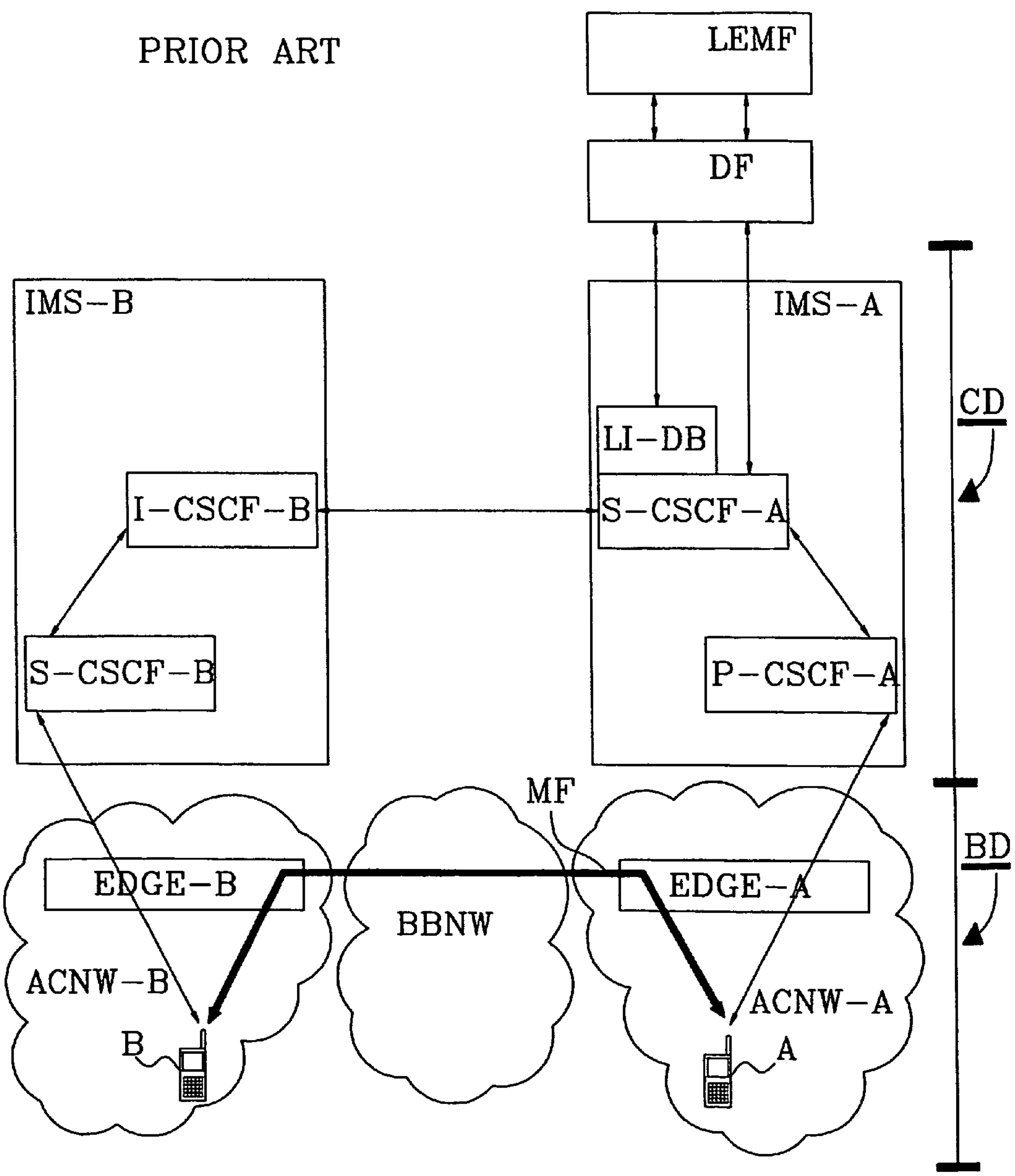
FIG. 1 belongs to prior art and discloses a block schematic illustration of two subscribers located in separate access networks. Control of the media flow is handled in a control domain and the media flow is handled in a bearer domain.

At first, interception of Intercept Related Information IRI according to current standardisation will be briefly discussed together with FIG. 1. Intercept Related Information IRI is defined as signalling information related to subscribers. FIG. 1 belongs to prior art and discloses a first mobile subscriber A and a second mobile subscriber B. The subscriber A is located in a first access network ACNW-A, which network is subscriber A's home location. Subscriber B is located in a second access network ACNW-B. Media flow MF, for example speech, is communicated between the subscribers A and B via a backbone network BBNW. The media flow is transported in a path in the bearer domain BD. The control of the media flow takes place in the control domain CD. Control information can for example be, signalling during set-up of a call. The control information related to the A subscriber is handled in the IP multimedia subsystem domain IMS-A and the control information related to the B subscriber is handled in the IP multimedia subsystem domain IMS-B. The control information passes several Call/Session Control Functions CSCF in both IMS-A and IMS-B. Requirements for interception of control information, also called Intercept related information IRI, are being standardised within the 3GPP and ETSI. FIG. 1 discloses interception of IRI according to prior art. The control information is hereby copied into a lawful interception database LI-DB located in relation to a serving CSCF in IMS-A, i.e. S-CSCF-A. The information is then forwarded from the LI-DB to a lawful interception monitoring facility LEMF, where the IRI is monitored. Information that is of interest to monitor can for example be if a certain subscriber has made a call, to whom the call was made and for how long time. After a call has been set-up between the subscriber A and B, the media flow MF between the subscribers is routed via an edge-node EDGE-A in the access network ACNW-A, the backbone network BBNW and via an edge-node EDGE-B in the access network ACNW-B.

According to the present invention, which now will be discussed, it is the content of communication that is of particular interest to monitor and furthermore to conceal the monitoring to involved parties.

Figure 2:
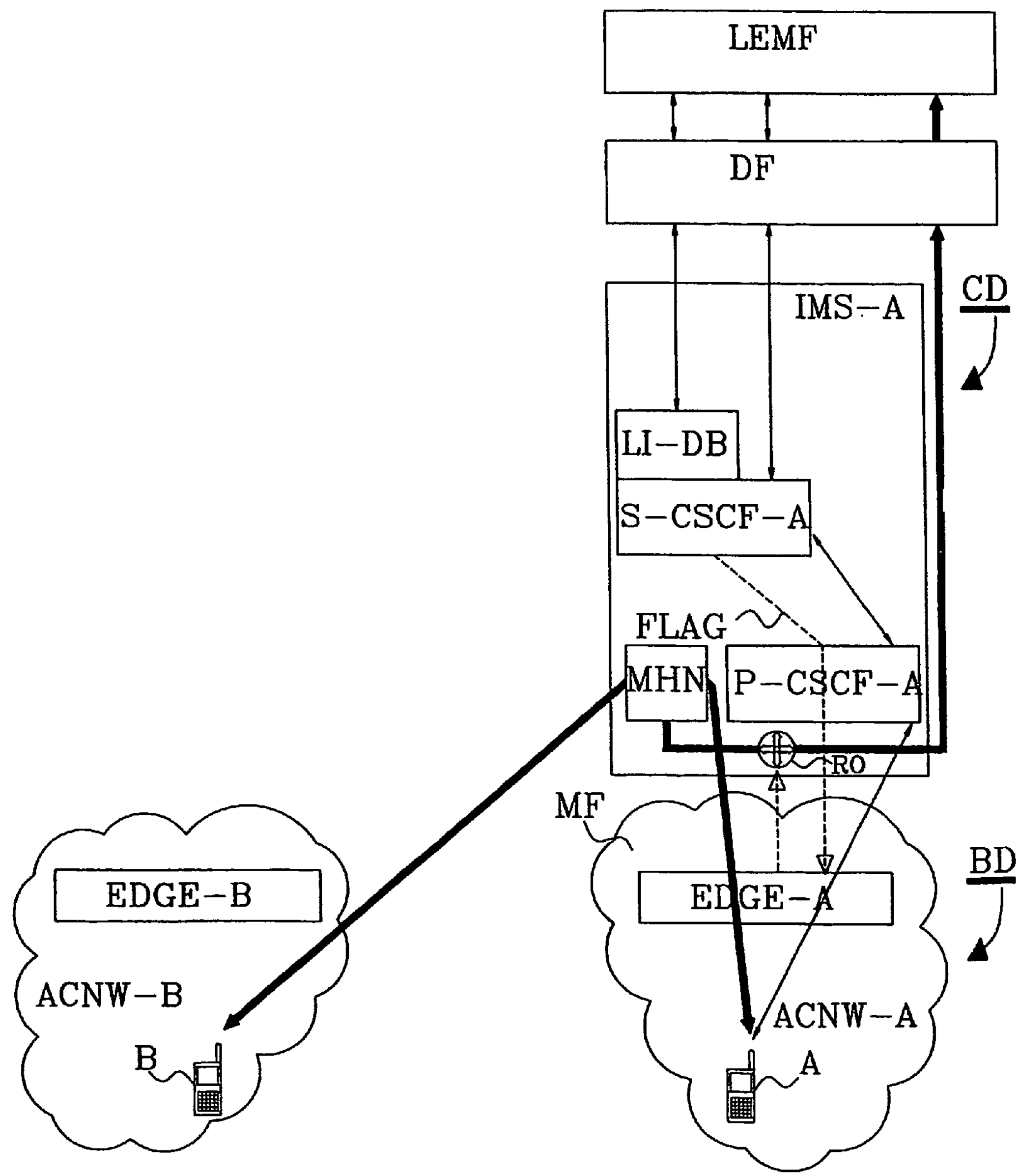
FIG. 2 shows a block schematic illustration of two subscribers located in different access networks. The figure discloses interception according to the invention.

FIG. 2 discloses interception according to the invention. The figure shows the same network as was disclosed in FIG. 1. The IP multimedia subsystem domain IMS-A in FIG. 2 comprises a media-handling node MHN. MHN is a collective term for different types of gateways. The media-handling node MHN is disclosed more in detail and will be further explained in FIG. 3. A database, for example the lawful interception database LI-DB contains identification of what subscribers that are to be intercepted. In this first embodiment, the first subscriber A is to be intercepted and consequently an identification of A is stored in LI-DB. When a call is set-up between the subscriber A and the subscriber B, monitoring according to the invention takes place. Before this monitoring is explained, the media-handling node MHN will be explained together with FIG. 3.

Figure 3:
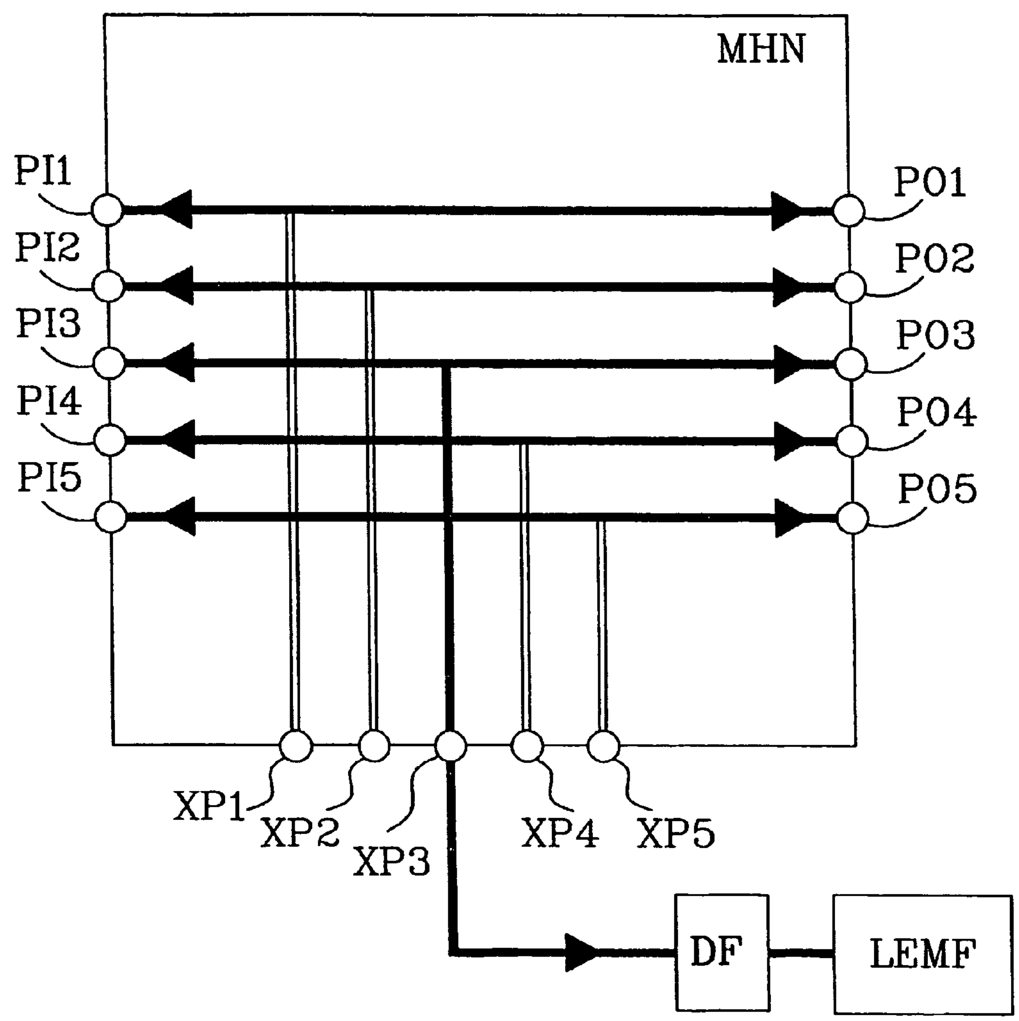
FIG. 3 shows a block schematic illustration of a Media-handling Node.

FIG. 3 discloses the media-handling node MHN shown in FIG. 2. The media-handling node can for example be a PSTN gateway used in public switching networks, a video gateway for video applications or a conference bridge used in multiple party conferences. The MHN in FIG. 3 comprises so-called first ports PI1-PI5 and second ports PO1-PO5. A media session flow between two subscribers is transported bi-directional in the media-handling node MHN between a first and second port. In the example in FIG. 3, five media session flows are transported in the MHN. According to the invention every session that is set up in the node MHN is assigned an extra port XP1-XP5 in the MHN. A media session between PI1 and PO1 for example is the cause of an extra port XP1. Media multiparty sessions between more than two ports in the MHN are treated in a similar way. If a session is set up between one first port PI1 and a number of second ports, PO1-POn, an extra port PX1 is always assigned to this session.

The invention will now be further explained together with FIGS. 2 and 3. The first subscriber A is, as mentioned, the subscriber for which monitoring is requested. An identification of the first subscriber A is stored in the database LI-DB. Monitoring starts when a connection is set-up between the first subscriber A and a second subscriber, in this example the subscriber B. Media flow session is hereby transported through the media-handling node MHN via the ports PI3 and PO3. Extra ports are set up in the node MHN for each session that is set up in the node independent of if monitoring is requested or not. An extra port XP3 is in this case set up adherent to the session between the first and second subscriber A and B. An indicator FLAG is sent from the database LI-DB to the edge node EDGE-A indicating that this session is to be monitored. Since the session is to be monitored the edge node initiates connecting of the extra port XP3, for example via a router RO, see FIG. 2. The media flow session between the ports PI3 and PO3 is hereby forwarded from the media-handling node MHN to the lawful interception monitoring facility LEMF, via the extra port XP3 and the router RO, see FIGS. 2 and 3. As an alternative, the indicator can be forwarded to the media handling node MHN whereby the extra port is connected. The indicator is added to the normal signalling associated with the session.

Figure 4:
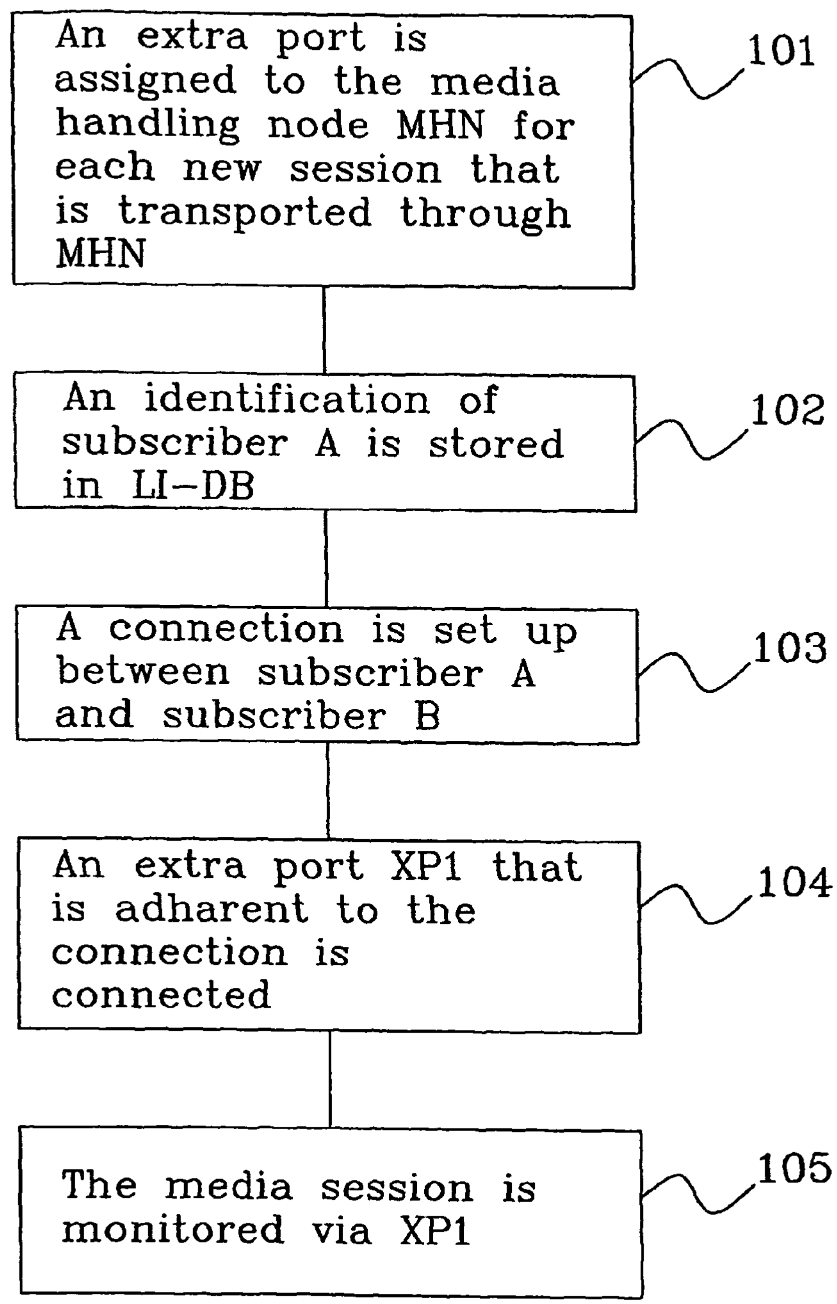
FIG. 4 shows a flow chart illustrating a method used to initiate interception according to the invention.

In FIG. 4 some essential steps of the invention is disclosed in a flowchart. The flowchart is to be read together with the earlier shown FIGS. 2 and 3. The method for monitoring media session according to the invention comprises the following steps:

- An extra port XP1-XP5 is assigned to the media-handling node MHN for each new session that is transported through the node. This step is shown in FIG. 4 by a block 101.
- An identification of the first subscriber A for which monitoring is desired is stored in the database LI-DB. This step is shown in FIG. 4 by a block 102.
- A connection between the first subscriber A and a second subscriber B is set up. This step is shown in FIG. 4 by a block 103.
- An extra port XP1 that is adherent to the session between the first and second subscriber A, B is connected. This step is shown in FIG. 4 by a block 104.
- The session between the first and second subscriber is monitored via the extra port XP1. This step is shown in FIG. 4 by a block 105.

Different variations are of course possible within the scope of the invention. The two subscribers A and B can be situated in the same access network or in different access networks in different countries. The subscriber unit for which interception is desired may have roamed to an access network in another country than the country of the subscribers home access network. In the embodiments, the subscriber A is the monitored subscriber and if using standard telecommunication terminology it can be assumed that the subscriber A also is the calling subscriber while subscriber B is the called subscriber. It is to be noted that the claimed invention also covers cases when the monitored subscriber is the called subscriber. Also conference calls involving more than two parties is covered by the claimed invention and of course also when more than one subscriber in the conference is monitored. It is important to observe that interception only is one type of monitoring for which the invention is applicable. Other types of monitoring might for example be monitoring of the type of media flow or quality measurements monitoring. The flag indicator is in the example sent during the call set-up session but can of course also be sent after the call set-up has finished in which case the media flow is re-routed via the lawful interception server.

The invention is not limited to the above described and in the drawings shown embodiments but can be modified within the scope of the enclosed claims.

The invention claimed is:

1. Method for monitoring media session flow in a telecommunication network comprising a media-handling node through which, sessions between subscribers are transported via first ports and second ports comprising the following steps:

assigning an extra port to the media-handling node of an internet protocol multimedia subsystem domain for each new session that is transported through the node, each extra port is unique to a particular new session, and each extra port is set-up independent of if monitoring is requested or not;

storing in a database, identification of a first subscriber for which monitoring is desired;

setting up a connection between the first subscriber and a second subscriber;

assigning an extra port that is adherent to the session between the first and second subscriber;

connecting the assigned extra port that is adherent to the session between the first and second subscriber;

monitoring the session between the first and second subscriber via the connected extra port.

2. The method according to claim 1, further comprising the step of sending an indicator from the database indicating that the extra port is to be connected.

3. The method according to claim 2 whereby the indicator is sent from the database to the media-handling node.

4. The method according to claim 1, further comprising the step of, setting up a three-part conference between the two involved subscribers and a monitoring facility.

5. The method according to claim 1, where each extra port is unique to the particular new session comprises where one of the extra ports is set-up and assigned to only one of the new sessions and not set-up and assigned to any of the other new sessions.

6. An arrangement to monitor media session flow in a telecommunication network comprising a media-handling node through which, sessions between subscribers are transported via first ports and second ports comprising:

means for assigning an extra port to the media-handling node of an internet protocol multimedia subsystem domain for each new session that is transported through the node, each extra port is unique to a particular new session, and each extra port is set-up independent of if monitoring is requested or not;

means for storing in a database, identification of a first subscriber for which monitoring is desired;

means for setting up a connection between the first subscriber and a second subscriber;

means for connecting an assigned extra port that is adherent to the session between the first and second subscriber;

means for monitoring the session between the first and second subscriber via the connected extra port.

7. The arrangement according to claim 6 further comprising means for sending an indicator from the database indicating that the extra port is to be connected.

8. The arrangement according to claim 6 further comprising means for setting up a three-part conference between the two involved subscribers and a monitoring facility.

9. The arrangement according to claim 6, where each extra port is unique to the particular new session comprises where one of the extra ports is set-up and assigned to only one of the new sessions and not set-up and assigned to any of the other new sessions.

10. A method implemented by a media-handling node for monitoring media session flow in a telecommunication network through which sessions between subscribers are transported via first ports and second ports in the media-handling node, the method comprising the following steps:

assigning an extra port for each new session that is transported through the media-handling node, each extra port is unique to a particular new session, and each extra port is set-up independent of if monitoring is requested or not;

setting up a connection between a first subscriber and a second subscriber using at least one of the first ports and at least one of the second ports;

receiving an indicator indicating that the first subscriber is to be monitored such that the extra port unique to the session between the first subscriber and the second subscriber is to be connected; and connecting the extra port that is adherent to the session between the first and second subscriber, where the session between the first subscriber and the second subscriber is monitored via the connected extra port.

11. The method according to claim 10, where each extra port is unique to the particular new session comprises where one of the extra ports is set-up and assigned to only one of the new sessions and not set-up and assigned to any of the other new sessions.

12. A system comprising:

an internet protocol multimedia subsystem domain which comprises:

a database configured to store identifications of subscribers for which monitoring is desired;

a media-handling node through which sessions between subscribers are transported via first ports and second ports, the media-handling node configured to:

assign an extra port for each new session that is transported there through, each extra port is unique to a particular new session, and each extra port is set-up independent of if monitoring is requested or not;

set-up a connection between a first subscriber and a second subscriber using at least one of the first ports and at least one of the second ports; and an edge node configured to:

receive an indicator from the database indicating that the first subscriber is to be monitored;

initiate connecting the extra port that is adherent to the session between the first and second subscriber, where the session between the first subscriber and the second subscriber is monitored via the connected extra port.

13. The system according to claim 12, where each extra port is unique to the particular new session comprises where one of the extra ports is set-up and assigned to only one of the new sessions and not set-up and assigned to any of the other new sessions.

* * * * *

UNITED STATES PATENT AND TRADEMARK OFFICE

CERTIFICATE OF CORRECTION

PATENT NO. : 8,693,376 B2
APPLICATION NO. : 10/595145
DATED : April 8, 2014
INVENTOR(S) : Ekstrom et al.

It is certified that error appears in the above-identified patent and that said Letters Patent is hereby corrected as shown below:

In the Claims:

In Column 6, Line 31, in Claim 10, delete “port unique” and insert -- port is unique --, therefor.

Signed and Sealed this
Twenty-second Day of July, 2014

Michelle K. Lee
*Deputy Director of the United States Patent and Trademark Office*